United States Patent
Ando

(10) Patent No.: US 6,751,514 B2
(45) Date of Patent: Jun. 15, 2004

(54) SERVICE METHOD, SERVICE SYSTEM AND MANUFACTURING/INSPECTION APPARATUS

(75) Inventor: Hiroyoshi Ando, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/811,714

(22) Filed: Mar. 19, 2001

(65) Prior Publication Data

US 2001/0047216 A1 Nov. 29, 2001

(30) Foreign Application Priority Data

Aug. 24, 2000 (JP) ..................... 2000-254497

(51) Int. Cl.⁷ .............................. G06F 17/60
(52) U.S. Cl. ...................... 700/109; 705/400
(58) Field of Search ............... 700/36, 83, 121, 700/56, 109, 108, 110, 111, 115, 116, 117; 705/29, 400

(56) References Cited

U.S. PATENT DOCUMENTS

| | | | | |
|---|---|---|---|---|
| 5,249,120 A | * | 9/1993 | Foley ..................... | 364/401 |
| 5,737,581 A | * | 4/1998 | Keane ..................... | 395/500 |
| 6,131,052 A | * | 10/2000 | Ban et al. ................ | 700/121 |
| 6,185,474 B1 | * | 2/2001 | Nakamura et al. .......... | 700/121 |
| 6,249,776 B1 | * | 6/2001 | Bajuk et al. ............. | 705/400 |
| 6,385,497 B1 | * | 5/2002 | Ogushi et al. ............ | 700/110 |
| 2002/0161478 A1 | * | 10/2002 | Ikeda et al. ............. | 700/245 |

OTHER PUBLICATIONS

The Authoritative Dictionary of IEEE Standards Terms 2000, 7th edition, Standards Information Network IEEE Press, pp. 725–726.*

* cited by examiner

Primary Examiner—Leo Picard
Assistant Examiner—Sean P Shechtman
(74) Attorney, Agent, or Firm—Kenyon & Kenyon

(57) ABSTRACT

There is provided a service method, a service system, and a manufacturing/inspection apparatus that can reduce the initial cost of use of the apparatus at the time of introducing a manufacturing/inspection apparatus and maintain the accuracy after introduction of the apparatus. In the service method for using the manufacturing/inspection apparatus for manufacturing or inspecting products such as semiconductor wafer, semiconductor device, exposure mask or liquid crystal device, the charge for use of the manufacturing/inspection apparatus is set based on the manufacturing or inspection difficulty information of the product manufactured or inspected with the manufacturing/inspection apparatus and the running information of the manufacturing/inspection apparatus stored in a physical memory medium.

17 Claims, 10 Drawing Sheets

FIG. 2

APPARATUS RUNNING INFORMATION — 21

- NUMBER OF SHEETS TO BE PROCESSED
- RUNNING TIME
- TOTAL NUMBER OF SHOTS

PRODUCT GRADE INFORMATION — 22

- VARIOUS CALIBRATION TOLERABLE VALUE
- SIZE ACCURACY TOLERABLE VALUE
- POSITION ACCURACY TOLERABLE VALUE
- ALIGNMENT ACCURACY TOLERABLE VALUE

APPARATUS CONDITION INFORMATION — 23

- VARIOUS RESIDUES OF CALIBRATION AND COMPENSATION
- CALIBRATION CONDITION PARAMETER
- CALIBRATION HISTORY
- ACCUMULATED USE TIME OF LIMITED-LIFE PART
- GENERATED ERROR INFORMATION

FIG. 5

EXAMPLE OF CHARGE-CALCULATION ALGORITHM (EXAMPLE 1) ··· SIMPLE PROPORTION TO THE NUMBER
OF SHEETS TO BE PROCESSED
CHARGE FOR USE=NUMBER OF SHEETS TO BE PROCESSED×UNIT PRICE IN THE CONTRACT
(EXAMPLE 2) ··· SIMPLE PROPORTION TO NUMBER OF SHOTS
CHARGE FOR USE=TOTAL NUMBER OF SHOTS×UNIT PRICE IN THE CONTRACT
(EXAMPLE 3) ··· PROPORTION TO THE NUMBER OF SHEETS
(CONSIDERING THE GRADE)
CHARGE FOR USE=NUMBER OF SHEETS TO BE PROCESSED×UNIT PRICE IN
THE CONTACT×GRADE COEFFICIENT
GRADE COEFFICIENT:ROUGH PROCESS:0.8
USUAL PROCESS:1.0
FINE PROCESS :1.4
(EXAMPLE 4) ··· PROPORTIONAL TO THE NUMBER OF SHEETS PROCESSED-
THROUGHPUT DELAY(CONSIDERING THE GRADE)
CHARGE FOR USE=NUMBER OF SHEETS PROCESSED×UNIT PRICE IN
THE CONTRACT×GRADE COEFFICIENT-RUNNING TIME×(1.4-GRADE COEFFICIENT)
(EXAMPLE 5) ··· PROPORTIONAL TO THE NUMBER OF SHOTS-THROUGHPUT DELAY
(CONSIDERING THE GRADE)
CHARGE FOR USE=TOTAL NUMBER OF SHOTS×UNIT PRICE IN
THE CONTRACT×GRADE COEFFICIENT-RUNNING TIME×(1.4-GRADE COEFFICIENT)

FIG. 6

EXAMPLE OF CHARGE REPORT

<REPORT OF CHARGE FOR USE>

CUSTOMER ID:EB********
COLLECTION DATE:2000*06/20

CHARGE FOR USE:$x, xxx, xxx
(PRECEDING DAY:$Z, ZZZ, ZZZ)

(CALCULATION CONDITION)
NUMBER OF SHEETS TO BE PROCESSED:13 SHEETS
RUNNING TIME:12HOURS
TOTAL NUMBER OF SHOTS:3.3E9
PRODUCT GRADE COEFFICIENT:1.0
APPARATUS CONDITION COEFFICIENT:0.1
CALCULATION ALGORITHM:No.4

FIG. 7

EXAMPLE OF PERIODICAL CHARGE REPORT

<REPORT OF MONTHLY CHARGE FOR USE>

CUSTOMER ID:EB********
COLLECTION DATE:2000/05/21~2000/06/20

CHARGE FOR USE:$x, xxx, xxx
(PRECEDING DAY:$Z, ZZZ, ZZZ)

(CALCULATION CONDITION)
TOTAL NUMBER OF SHEETS PROCESSED:124 SHEETS
TITAL RUNNING TIME:240 HOURS
TOTAL NUMBER OF SHOTS:8.3E12
AVERAGE GRADE COEFFICIENT:1.2
AVERAGE APPARATUS CONDITION COEFFICIENT:0.1
CALCULATION ALGORITHM:No.4

FIG. 9

EXAMPLE OF SERVICE REPORT

<SERVICE REPORT>

CUSTOMER ID:EB********
COLLECTION DATE:2000*06/20

1. LIMITED-LIFE PART INFORMATION
   (1) PA HALOGEN LAMP
      - ACCUMULATED USE TIME:150 HOURS
      - RECOMMENDED EXCHANGE TIME:NEXT PERIODICAL CHECK(2000/12)

2. CALIBRATION HISTORY INFORMATION
   (1) CURRENT DENSITY
      - CURRENT DENSITY CHANGE DURING 7 DAYS IS 0.05.
      - ESTIMATED CHIP EXCHANGE TIME IS 2001/03.

3. ERROR INFORMATION
   (1) MARK DETECTION
      - STANDARD MARK DETECTION REPRODUCIBILITY HAS EXCEEDED THE TOLERABLE VALUE .
      - CHANGE OF MARK POSITION USED IS RECOMMENDED.

FIG. 10

EXAMPLE OF USER ASSISTANCE                                      101

<REQUEST ENTRY COLUMN>

102
CUSTOMER ID:EB********
COLLECTION DATE:2000*06/20
    103   104

1. CONCERNING THE ACCURACY
   GIVE A MARK TO THE ITEM FOR FURTHER IMPROVEMENT IN THE ACCURACY.
   ☐SIZE ACCURACY  ☐CONNECTION ACCURACY  ☐POSITION ACCURACY
   ☐ALIGNMENT ACCURACY

PLEASE FULL IN THE TARGET SPECIFICATION OF THE
   ACCURACY IMPROVEMENT.
   SIZE ACCURACY:     CONNECTION ACCURACY:
   POSITION ACCURACY:  ALIGNMENT ACCURACY:

2. CONCERNING THE CALIBRATION ACCURACY
   GIVE A MARK TO THE ITEM FOR FURTHER IMPROVEMENT IN
   THE ACCURACY.
   ☐COMPENSATION FOR BEAM SIZE    ☐BEAM ALIGNMENT
   ☐COMPENSATION FOR DEFLECTION   ☐HEIGHT DETECTION
     DISTORTION
   ☐COMPENSATION FOR FOCUS
   ☐CURRENT DENSITY MEASUREMENT

3. OTHERS
   PLEASE FILL IN YOUR REQUEST.

SERVICE METHOD, SERVICE SYSTEM AND MANUFACTURING/INSPECTION APPARATUS

BACKGROUND OF THE INVENTION

The present invention relates to a manufacturing/inspection apparatus for manufacturing or inspecting semiconductor wafer, semiconductor device, mask for exposure and liquid crystal device and a service system or a service method for use of these manufacturing/inspection apparatuses.

A manufacturing/inspecting apparatus for manufacturing and inspecting semiconductor wafer, semiconductor device, exposure mask and liquid crystal device has generally been installed in a plurality of units in predetermined lines within a manufacturing factory and are placed in a local operation environment. Otherwise, these manufacturing and inspecting apparatuses are connected through a local area network and if the operating conditions are controlled with a work station or the like, these have been placed in the environment under the control in the range connected with the local area network within the factory. Therefore, the manufacturers of these products purchase the apparatus from the manufacturers of the manufacturing/inspecting apparatus and the manufacturers of each product, namely the users of the manufacturing/inspecting apparatus have established the manufacturing process.

On the other hand, as an example, in the case where a large-scale system such as an inspecting apparatus or an electronic drawing apparatus using an electronic microscope is introduced, a purchaser bears a large share because such a system is very expensive. Moreover, after purchasing the apparatus, adjustment with those who are skilled in this art is often required until the predetermined manufacturing accuracy and inspection accuracy can be attained. In addition, in view of maintaining the accuracy once achieved, it is necessary to always supervise the apparatus condition and execute the adjustment as required. Moreover, the purchaser is required to prepare the training for the workers with a large cost sharing in order to improve the skill of workers who conduct the adjustment. Therefore, the purchase requests the dispatch of workers from the apparatus manufacturer in view of lowering the cost sharing. However, since the apparatus manufacturers do not have many workers, if a large number of apparatuses are purchased, there rises a problem that customer services due to the dispatch of workers becomes insufficient.

SUMMARY OF THE INVENTION

Therefore, an object of the present invention is to provide a service method, a service system and a manufacturing/inspection apparatus that can reduce the initial cost at the time of introducing such a manufacturing/inspection apparatus and maintain the accuracy after introduction of the apparatus.

An embodiment of the present invention is a manufacturing/inspection apparatus for manufacturing the products such as semiconductor wafer, semiconductor device, exposure mask or liquid crystal device, wherein a memory device is provided to store at least any information piece of the processing information indicating the quantity of manufactured or inspected products, accuracy information indicating the manufacturing or inspection accuracy of the products, running information indicating the running conditions of the manufacturing/inspection apparatus and calibration information indicating a calibration value required for apparatus running control at the time of manufacture or inspection of the manufacturing/inspection apparatus.

Moreover, another embodiment of the present invention is a service method for utilizing a manufacturing/inspection apparatus for manufacturing and inspecting the products such as semiconductor wafer, semiconductor device, exposure mask or liquid crystal device, wherein the charge for use of the manufacturing/inspection apparatus is set based on manufacturing or inspection difficulty information of the product manufactured or inspected with the manufacturing/inspection apparatus and running information of the manufacturing/inspection apparatus stored in a physical storing medium.

In order to reduce the initial cost at the time of introducing an expensive manufacturing/inspection apparatus, a means for requesting the charges depending on the conditions of use of the apparatus just like "quantity system" may be considered. In the manufacturing/inspection apparatus of the related art for manufacturing and inspecting semiconductor wafer, semiconductor device, exposure mask, liquid crystal device or the like, since such an apparatus is not connected with an external communication network, it has been impossible to calculate the charges for use by monitoring the operating condition of apparatus from the external side. However, under the current environment where connection can be easily made to the external communication network such as the Internet, it is possible to set the changes for use and demand this charge in place of the initial cost by externally monitoring the operating conditions of the apparatus via Internet and thereby, it is also possible to reduce the initial cost and maintaining of the accuracy after introduction of the apparatus. Moreover, since dispatch of workers is no linger required, service burdens on the apparatus manufacturer can also be reduced.

Here, it is desirable for the setting of the charges for use that such setting is in the correlation with the difficulty of service in the prior art. For example, in the case where a circuit pattern of the semiconductor device is drawn with an electronic beam drawing apparatus, the thinner the drawing line is, or the larger the change of size of the adjacent line is, the more difficult the improvement of manufacturing accuracy is. Therefore, maintaining of the apparatus accuracy largely depends on the skill and share of the service workers. Accordingly, it is desirable for the apparatus manufacturer to set the charges based on the manufacture or inspection difficulty information.

For example, in the electronic beam drawing apparatus, since the depicted pattern information is stored as the data in the apparatus itself, quality of the manufactured product can be evaluated from such information. Namely, an ultra-fine and high accuracy product can be discriminated from the minimum size of depicted pattern, setting of calibration tolerable value of apparatus and leaving amount of compensation of calibration. Therefore, when highly accurate drawing is conducted, even if the number of products to be processed in the predetermined period is rather small, it will be possible to demand the user to pay charges for use by considering that a product having a higher additional value is manufactured for the user.

Not only is such a charging system effective for reduction of initial cost of user but also the apparatus manufacturer can obtain the periodical income while the apparatus is operating normally. Therefore, here rises a merit that the running service for user can be implemented very easily.

The information extracted from the apparatus to calculate charges for use of an apparatus is also the accuracy information and operating condition of the apparatus. Therefore, almost real-time service or user assistance using this information is also possible and more delicate user support from the view point of time and quality can be implemented in addition to the effect of the above regular incomes.

Here, it is possible to connect in direct the control computer of the apparatus to the communication entwork to give permission, namely to operate the user support system, but it is desirable from the viewpoint of security to avoid direct connection of the apparatus control computer storing the user information to the external communication network. Usually, an exclusive server is installed for connection with the external communication network, but it is difficult to say that the environment connected for the communication is safe even if any measure is provided against the invasion of hackers.

Because of such a situation explained above, a safe information security system is essential for actual operation of the service system utilizing the communication network.

In the present invention, regarding the point explained above, only the predetermined information is transmitted to the external side by transmitting the information to the server only for connection of communication network via the physical media such as MO, CD-RW, DVD-RAM, and DVD-RW. Moreover, since it is impossible to observe in direct the apparatus control computer from the external side, invasion by hackers can be stopped in the exclusive server at worst and therefore no interference will be given to the operation of the apparatus.

BRIEF DESCRIPTION OF THE DRAWINGS

FIG. 2 illustrates a data format indicating the contents of information pieces collected with an apparatus control computer.

FIG. 5 illustrates a display image of an example of the apparatus use charge calculation algorithm.

FIG. 6 illustrates a display image of an example of the report of the charges for use.

FIG. 7 illustrates a display image of an example of the report of periodical charges for use.

FIG. 9 illustrates a display image of an example of the service report.

FIG. 10 illustrates a display image of an example of the user assistance.

DESCRIPTION OF THE PREFERRED EMBODIMENTS

A preferred embodiment of the present invention will be explained with reference to the accompanying drawings.

Figure 1:
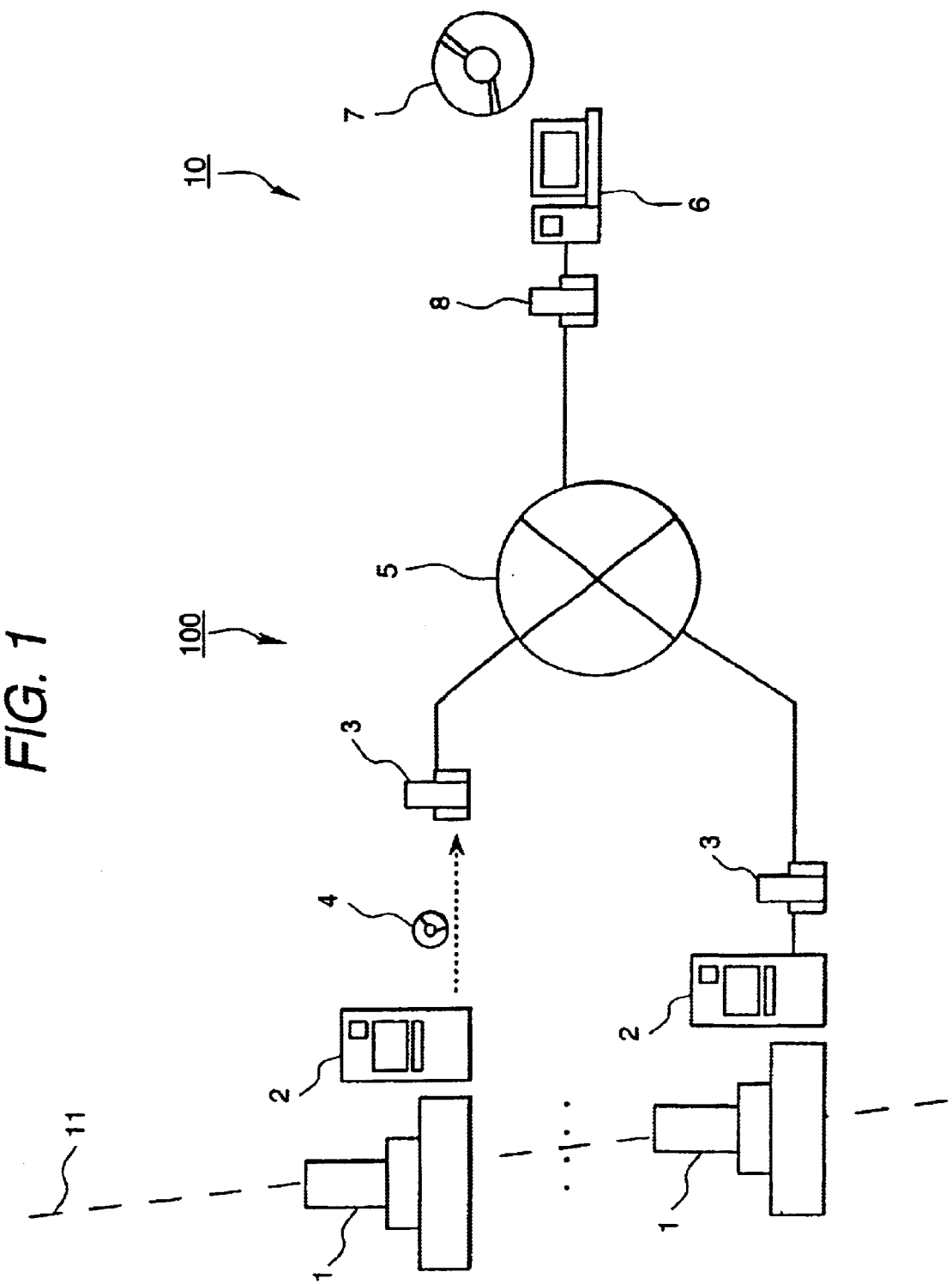
FIG. 1 illustrates a system structure of an embodiment of the present invention.

FIG. 1 illustrates an example of the apparatus structure as an embodiment of the present invention. In FIG. 1, a semiconductor device manufacturing apparatus, for example, an electronic beam drawing apparatus 1 is installed in the semiconductor manufacturing line 11.

As is well known, various kinds of semiconductor manufacturing apparatuses such as CVD and inspection apparatuses are installed in the semiconductor manufacturing line 11. In this embodiment, an electronic beam drawing apparatus will be explained as an example, but the present invention is not limited thereto and the present invention brings about similar effects for all manufacturing/inspection apparatuses.

Moreover, in this embodiment, the semiconductor device manufacturing line is defined as an example in this embodiment but a similar effect can also be attained when the present invention is employed for the products requiring the highly accurate manufacturing and inspection techniques such as the semiconductor wafer, exposure mask and liquid crystal device.

In FIG. 1, an electronic beam drawing apparatus 1 is installed in the semiconductor manufacturing line 11 of a user with zero initial cost or at a lower cost from a delivery company or manufacturing maker (hereinafter, referred as only "maker"). In order to cover the cost required for initial installation, a semiconductor manufacturing apparatus use permission system 100 is then installed and thereby the various information pieces required for calculation of charges for the permitted use are communicated with the maker side via an apparatus control computer 2.

Various information pieces from the apparatus control computer are accumulated in direct in the exclusive server 3 via the physical media 4 or the communication line. Information accumulated in an exclusive server 3 is transmitted to a computer system 10 for permission of use from the maker via a communication network 5 such as Internet and Intranet. This computer system 10 is mainly composed of an exclusive server 8, a host computer 6 of maker and a database 7 for each customer.

The information transmitted via the communication network 5 is accumulated in the exclusive server 8 and used for the process in the host computer 6 together with the data accumulated in the customer database 7. Thereby, a charge for permitted use of the apparatus is calculated for a certain period such as every day, every week and every month and is then printed. Moreover, this content is transmitted to a user via the communication network 5 or mail for the purpose of payment process.

As explained above, the apparatus control computer 2 has a means for transmitting the data to the exclusive server 3 connected to the external communication network with a certain means. This structure may be replaced with a method, for example, that a user manually moves the physical media 4 to the exclusive server 3 from the apparatus control computer.

The exclusive server 3 is connected to the external communication network 5 such as the Internet and this server is also connected, for example, with the other drawing apparatus of the same user.

On the other hand, the other computer system 10 is also connected to this communication network and this system periodically receives the necessary information depending on the customer contract.

As an actual running example, the charge for use is calculated from the operating condition of the apparatus and is then notified (claimed) to the user.

FIG. 2 illustrates a data format of the information transmitted from the apparatus control computer 1.

The first information group 21 is the apparatus running information and is basically the user information. This information becomes a quantity factor. First, in order to calculate the charge of use of the apparatus, information indicating the number of sheets of wafer or mask processed with the apparatus is necessary. Usually, the larger the number of sheets processed is, the higher the charge for use becomes.

Next, the apparatus running time information is necessary. Namely, even when the number of sheets processed is rather small, a higher charge for use can also be requested when the apparatus running time is rather longer. Otherwise, it is also possible to set, from such information pieces, the charge for use by calculating the number of sheets processed per unit time.

In addition, when the total drawing shot numbers per sheet of wafer or mask can be detected, the total number of drawing shots is used as the information. Otherwise, it is also possible to calculate the charge for use with the total number of drawing shots that is assumed to include both the number of sheets processed and the running time information pieces.

As explained above, the quantity to calculate the basic charge for use of apparatus can be obtained by detecting the number of wafers or masks processed and the apparatus running time, namely the actual drawing time and the total number of shots per sheet.

The second information group 22 is grade information of product. This information is user information not disclosed intrinsically. However, in the case of the electron beam drawing apparatus, it can be assumed to a certain degree whether a product is drawn under rough adjustment or fine adjustment from the calibration tolerable value information of the apparatus itself and residue of compensation of structure. Here, as the information of this category, it is also possible to write the target accuracy within the drawing job like a memorandum as the size accuracy and position accuracy in addition to the product information. Since such information is not the information of the direct product, such information can be assumed as the information that can be disclosed rather easily with a user.

In the case of the apparatus other than the electron beam drawing apparatus not providing a memory device for storing above information, the similar process can be attained by adding a memory device to store the information.

As explained above, it can be detected how many products of what grade have been manufactured from the product grade information and the apparatus running information and thereby the quality grade for charge for use of apparatus can also be calculated.

The third information group 23 is apparatus condition information. This information indicates the quality grade for calculating charge for use but works as a negative factor. However, when a certain reference point is considered as the zero point, it can be processed as the positive or negative factor. In addition, such a factor or coefficient can be set to zero depending on the conditions based on the contract at the time of sale between the maker and the user. This information group indicates the conditions of the apparatus and the deteriorated accuracy can also be detected by analyzing the calibration history. The information of this category is mainly used for user support. For example, when the accumulated running time of the life-limited product such as halogen lamp used in the apparatus is included in this information group, the running condition can be notified to the user before the life time is matured in order to propose the exchange of parts or moreover implement automatic issuing of order of the life-limited parts.

Moreover, it is also possible to previously identify the deteriorated portion of hardware by collecting and analyzing error log for the errors generated in the apparatus. Such service will bring about a regular income when it is comprised in the charge system through the contract between the maker and the user and moreover will offer almost real-time service to the users 24 hours a day.

The embodiment of the present invention has been outlined above and the charging system using the present invention will be explained practically.

Figure 3:
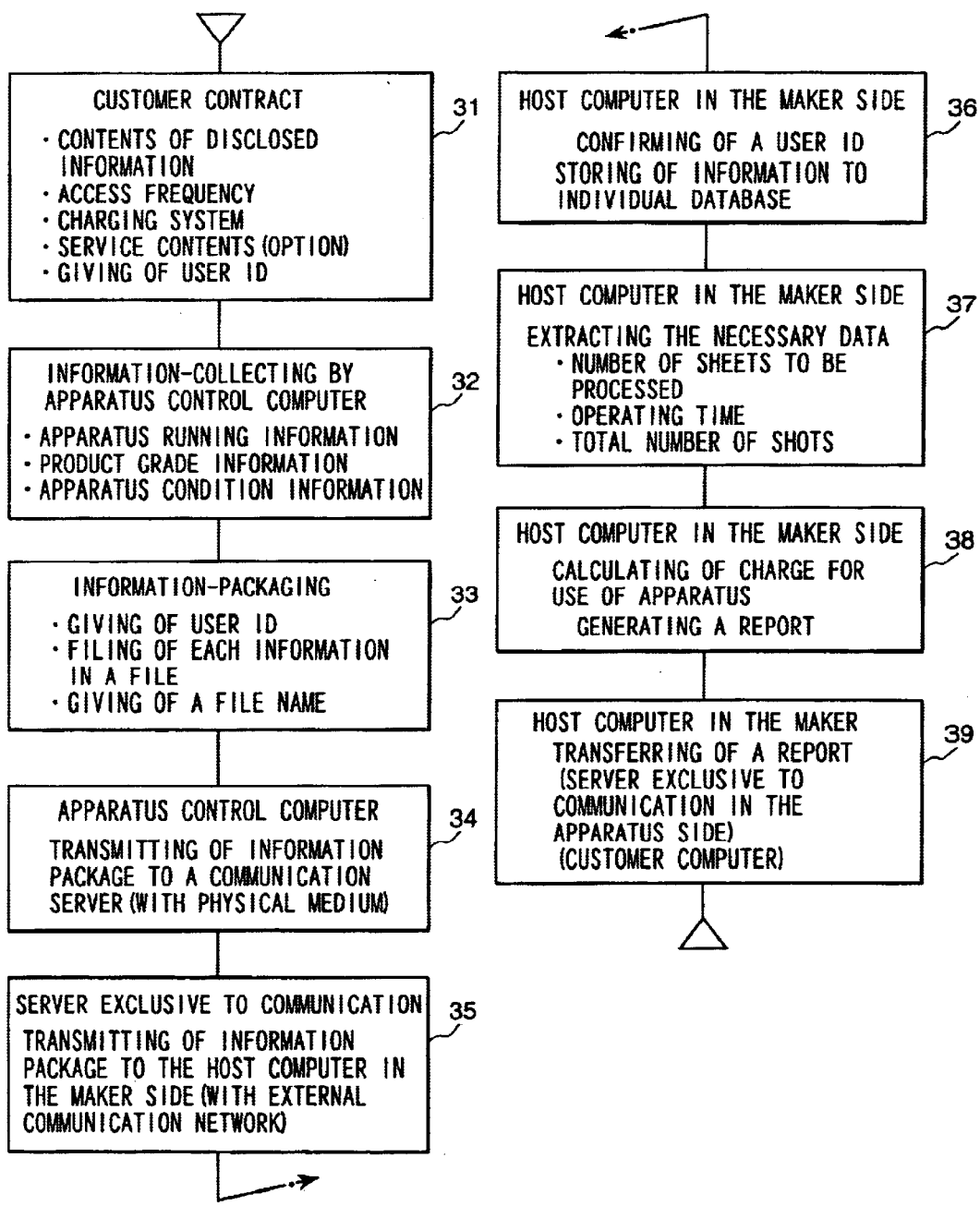
FIG. 3 illustrates a flowchart of the charging system.

FIG. 3 illustrates a process flowchart. In this embodiment, the data item is assumed to be transmitted to the exclusive server for connection of external communication network from the apparatus control computer, for example, with a robot hand controlled with the apparatus control computer using the physical media.

First, in the step 31, discussion and contract with a user are agreed for content of information to be disclosed, access frequency, charge system for product grade and content of option services or the like. When the contract is agreed, the user ID is given. This ID shall previously be set to the apparatus control computer.

In the step 32, the apparatus control computer collects, for the predetermined time or in the predetermined timing, the apparatus running information, product grade information and apparatus condition information and the user ID is given for the packaging in the step 33. In this case, the data may be compressed to reduce the data capacity. The packaging means that a series of information pieces are stored in one file depending on the predetermined regulation and a name is given to this file. The information packaged in the step 34 is then stored to a DVD-RAM or a DVD-RW with a physical media connected to the apparatus control computer, for example, DVD-RAM or DVD-RW drive. Moreover, the apparatus control computer inserts the DVD-RW to the DVD-RAM or DVD-RW drive controlled with the exclusive server for external communication network by controlling the robot for DVD-RW handling.

In the step 35, the exclusive server for external communication accesses periodically the DVD-RAM or DVD-RW drive. When the DVD-RAM or DVD-RW is inserted, this server transmits the folder given the name depending on the predetermined regulation of the DVD-RAM or DVD-RW to the host computer in the maker side via the communication network such as the Internet.

In the step 36, the host computer opens the transferred folder as required to confirm the user ID and the access right of the relevant user ID. Next, the apparatus running information, product grade information and apparatus condition information are stored in the respective apparatus log files.

Figure 4:
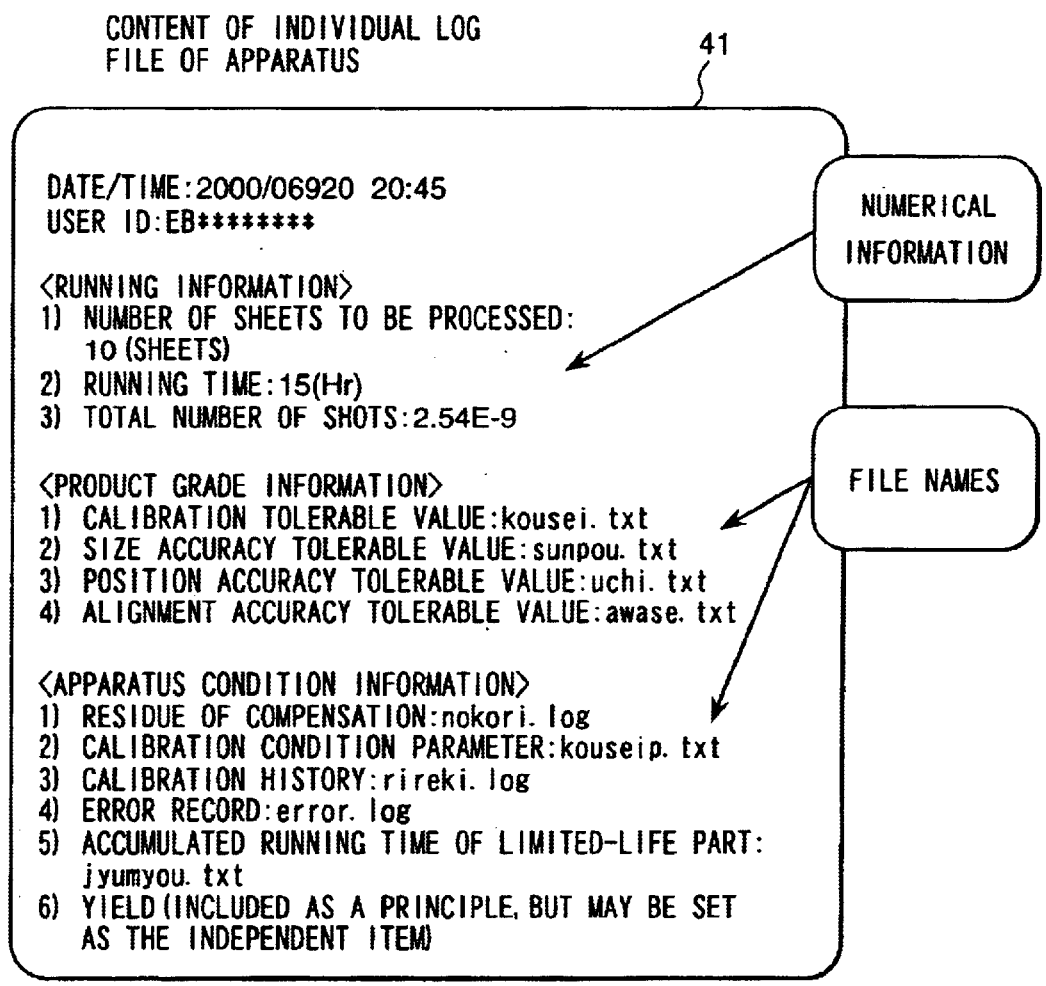
FIG. 4 illustrates a display image of an information format example of an individual user information file.

An apparatus log file 41 has a format, for example, as illustrated in FIG. 4. The apparatus condition information sometimes includes the yield information or is sometimes calculated independently as the external factor.

This embodiment relates to calculation of charge for use of the apparatus. For this purpose, the number of sheets for drawing process, running time and total number of shots are extracted from the information in the step 37 and the charge for use can be calculated depending on the predetermined algorithm.

An example of algorithm is illustrated in FIG. 5. As illustrated in FIG. 5, there are some examples for the charge calculation algorithm. Only one example will be considered here.

Moreover, the host computer generates in the step 38 the collected information and a charge report 61 for a user based on the above calculation result.

An example of this report is illustrated in FIG. 6. The charge report 61 includes a user ID 62, a collection date 63, a charge for use 64 and calculation conditions 65. As the calculation conditions, the number of sheets processed, running time, total number of shots, product grade coefficient, apparatus condition coefficient and example of employment of the calculation algorithm or the like are printed or displayed.

Finally, the host computer transmits the report to the exclusive server using the communication network in the step 39. When a user has the other computer to be connected to the external communication network, the report may also be transmitted to this computer.

The processes explained above are repeated to notify the charge for use of apparatus to a user but it is also possible to send to a user the centralized information that is also used as a bill as required at the end of month or term as the periodical charge report.

An example of this periodical charge report is illustrated in FIG. 7. A monthly charge report 71 illustrated in FIG. 7 is displayed with inclusion of a user ID 72, a collection period 73, a charge for use 74 and calculation conditions 75. In the case of this example, the average (product) grade coefficient and average apparatus condition coefficient are used.

Figure 8:
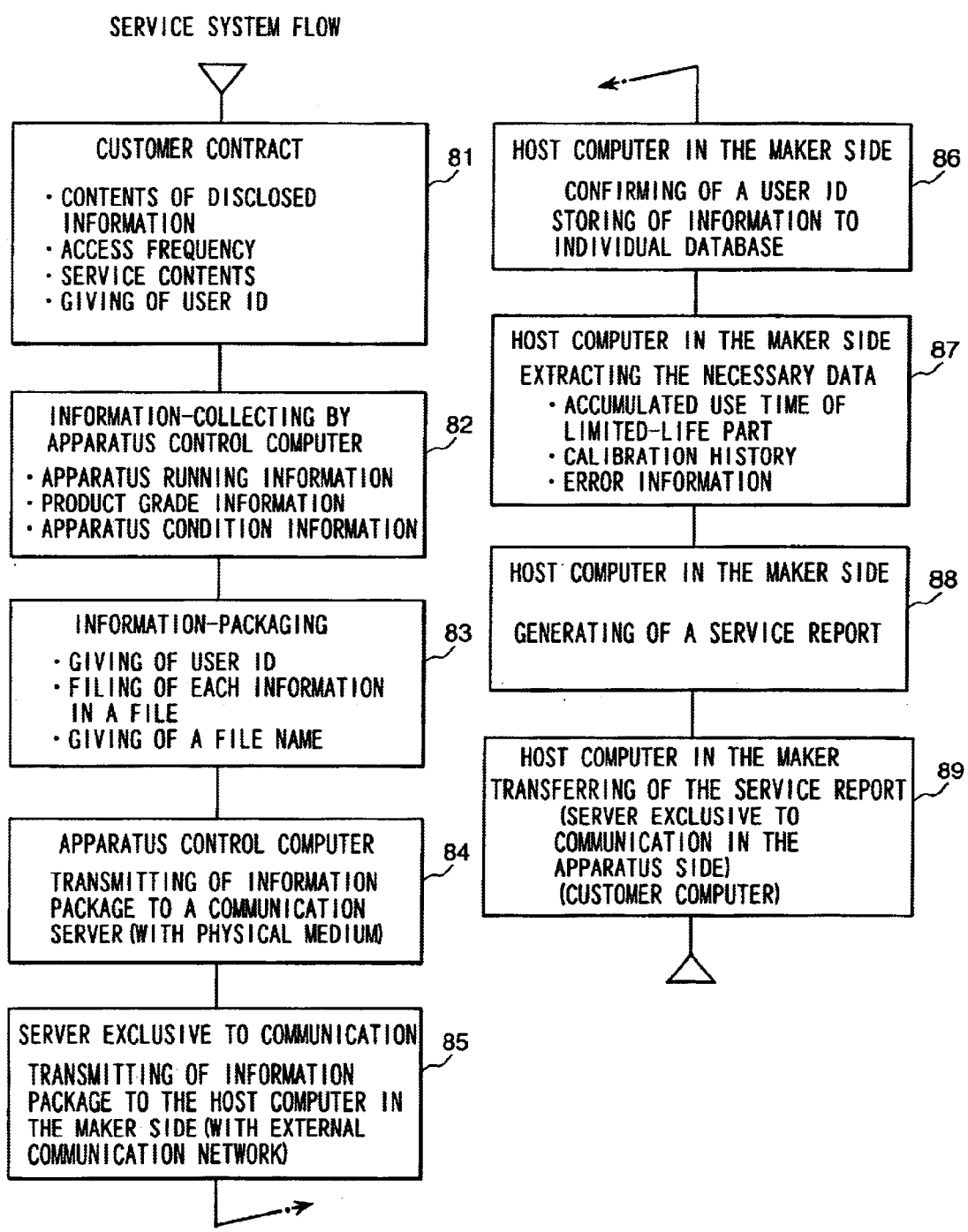
FIG. 8 illustrates a flowchart of the service system.

Next, an example of the service system will be explained practically. FIG. 8 illustrates a flowchart of this service system.

First, a contract with user is agreed in the step 81 and the user ID is given to the user as explained above. Here, the same user ID can also be used in the case of running the apparatus in combination with the charging system.

In regard to the actual running, the apparatus control computer collects in the step 82 the apparatus running information, product grade information and apparatus condition information and then transmits these information pieces to the exclusive server for external communication network via the physical media such as DVD-RAM or DVD-RW as in the case of the charging system. Moreover, the exclusive server also transmits this data item to the other host computers of the maker.

The host computer in the maker side confirms, in the step 83, the user ID and then stores each information in the apparatus log file. The processes of steps 84 to 86 are similar to that of FIG. 3.

In the case of the service system, following data item is extracted from the apparatus condition information stored in the step 87.

(1) Accumulated use Time Information of Limited-life Parts:

For example, the exchange time of halogen lamp may be notified when the exchange time is coming soon by detecting accumulation of the lighting time thereof. Moreover, whether exchange is necessary or not is determined at the time of periodical check and then it can be notified by calculating the average lighting time.

(2) Calibration History:

For example, the life-time of an electron source is determined from the current density measuring record and thereby the chip exchange time can be notified. Otherwise, the cleaning time for inside of a column or the part exchange time can be notified from the record of the beam size compensation amount.

(3) Error Information:

Information about factory analysis result and the method as a measure can be offered from the minor error information of apparatus. For example, if the apparatus standard calibration mark detection error is generated frequently, contamination of this calibration mark is assumed as a cause and therefore it can be proposed to exchange the calibration mark used.

The information as explained above is notified to users in the step 88, for example, with the display image of FIG. 9.

In a service report 91 of FIG. 9, a user ID 92, date and time 93, limited-life information 94, calibration history information 95 and error information 96 are displayed as illustrated in the figure.

As in the case of an example of the charging system, this report may be transmitted to the exclusive server or may be transmitted in direct to the user computer.

An example of the user assistance system is illustrated in FIG. 10.

In a user assistance system report 101 of FIG. 10, a user ID 102, a date and time 103 and a comment 104 are displayed as illustrated in the figure.

The apparatus control computer collects the information and transmits various information pieces to the host computer of maker via the external communication network through the exclusive server as in the case of the example explained above. To be particularly mentioned of the user assistance system is that the user request and comment information is included in this information. A user can receives the tuning information and parameter setting information for improvement of apparatus accuracy by inputting the necessary items for example to the display image illustrated in FIG. 10.

In this case, the host computer of the maker having received the information stores the request information of user to the individual file as the log and thereafter requests a response by transferring only the content of request to the department in charge. The relevant department sends a response in direct to the user or with telephone and electronic mail or the like. In this case, the end of a response is notified to the host computer and is then recorded in the customer information log. Here, it is also possible to provide a follow-up function for the items in which no response can be obtained after a certain period, for example, within 24 hours after receiving this information.

It is preferable for such process of the host computer that a program is previously generated but it is also possible that an exclusive operator executes the necessary process.

Figure 11I:
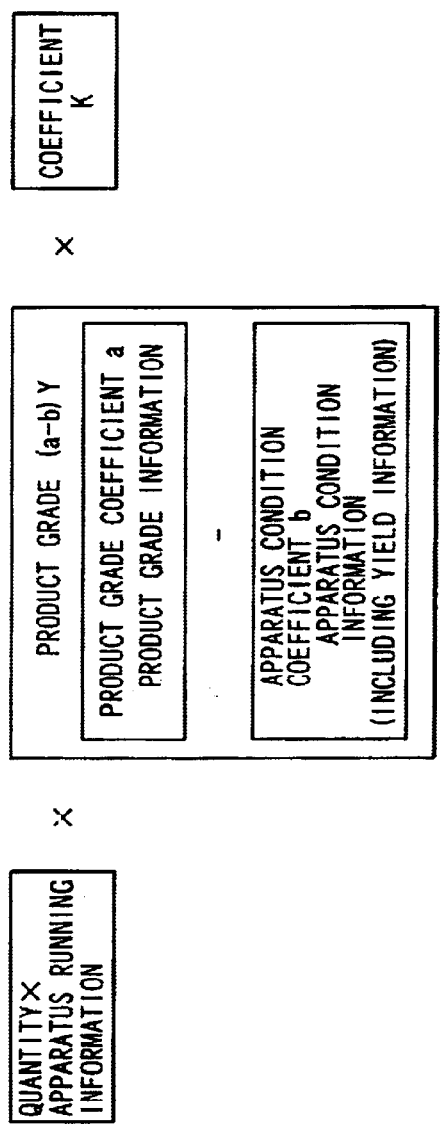
FIG. 11 schematically illustrates a method of calculating charges for use.
Figure 11:
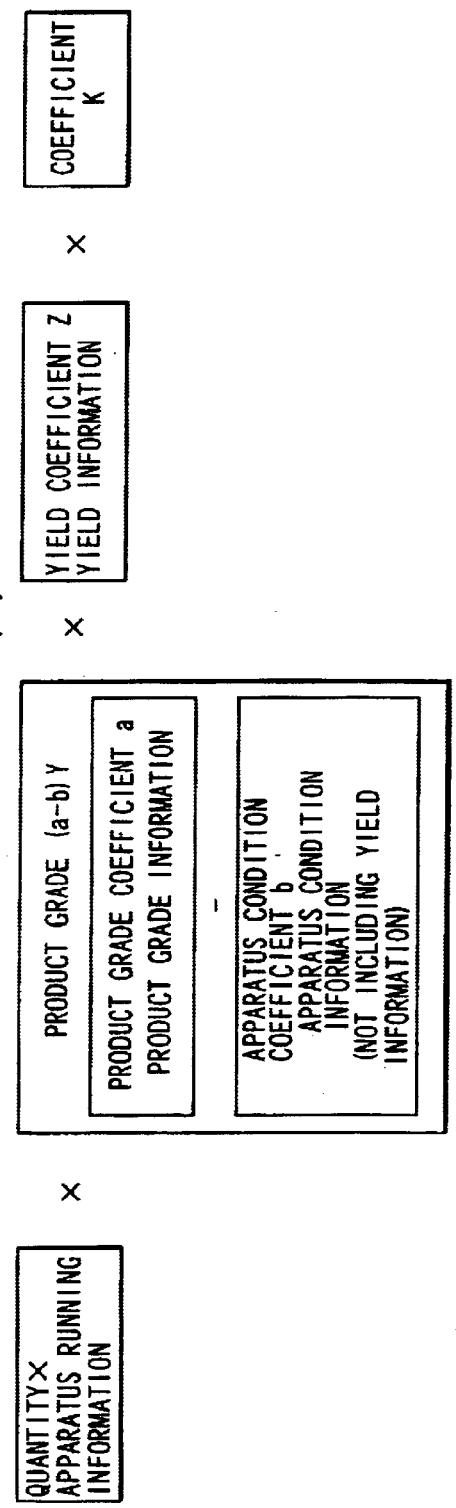

Next, a method of calculating charge for use in the host computer system 10 will be explained with reference to FIG. 11. In this figure, quantity expressed with the apparatus running information is defined as X, product grade coefficient expressed with the product grade information as a, apparatus condition coefficient expressed with the apparatus condition information as b, product grade expressed with a and b as (a−b)Y and coefficient for charging as k. In FIG. 11(i), the yield information is included in the apparatus condition information. In FIG. 11(ii), the yield information is not included in the apparatus condition information and the yield coefficient Z based on the yield information is provided independently as the external factor.

In the example of FIG. 11(i), the charge M for use is calculated with the formula $$M=\{X \times (a-b)Y\} \times k \text{ (where, } b \text{ includes 0)}$$

and this is the principle calculation method.

In the example of FIG. 11(ii), charge M for use is expressed by the following formulae.

$$M=\{X \times (a-b)Y\} \times z \times k \text{ (where, } b \text{ includes 0)}$$

$$Z=1 \pm \alpha \text{ (}\alpha \text{ is a coefficient smaller than 1)}$$

As explained above, the embodiment of the present invention smoothly assures reduction of initial cost at the time of introducing the apparatus, condition management after introduction of apparatus, service such as maintaining of the accuracy and offering of information in response to a customer request by connection of customer and apparatus information with the host computer of maker via the external communication network and thereby the total user support can be implemented.

Moreover, the present invention can provide a service method, service system and manufacturing/inspection apparatus that can reduce the initial cost when the manufacturing/inspection apparatus is introduced first and also maintain the accuracy after introduction of the apparatus.

What is claimed is:

1. A service system comprising a computer having a function to calculate a charge M for use of an apparatus for manufacturing products including a semiconductor wafer, a semiconductor device, an exposure mask and a liquid crystal device based on a result of a calculation of $$M=\{X\times(a-b)Y\}k \text{ (where, } b \text{ includes 0)}$$

wherein X is a quantity of processed sheets of the products, a is a product grade coefficient expressed with size accuracy, calibration tolerable value, alignment accuracy and position accuracy, b is an apparatus condition coefficient expressed with residue including calibration and compensation, calibration condition parameter, calibration history, accumulated use time of limited-life parts, and generated error information, (a−b) Y is a quality grade and k is a coefficient.

2. A service system comprising a computer having a function to calculate a charge M for use of an apparatus for manufacturing products including a semiconductor wafer, a semiconductor device, an exposure mask and a liquid crystal device based on the result of a calculation of $$M=\{X\times(a-b)Y\}\times Z\times k \text{ (where } b \text{ includes 0)}$$

wherein X is a quantity of processed sheets of the products, a is a product grade coefficient expressed with size accuracy, calibration tolerable value eliminating a yield, alignment accuracy and position accuracy, b is an apparatus condition coefficient expressed with residues including calibration and compensation, calibration condition parameter, calibration history, accumulated use of limited-life parts and generated error information, (a−b) Y is a quality grade, yield coefficient for the yield Z=1±α, where α is smaller than 1, and k is a coefficient.

3. A service system according to claim 2, wherein a database is provided to record the information about x, a, b, (a−b)Y, Z, k.

4. A service method for calculating the charge M for use of an apparatus for manufacturing products including a semiconductor wafer, a semiconductor device, an exposure mask and liquid crystal device based on the result of a calculation of $$M=\{X\times(a-b)Y\}k \text{ (where, } b \text{ includes 0)}$$

wherein X is a quantity of processed sheets of the products, a is a product grade coefficient expressed with size accuracy, calibration tolerable value, alignment accuracy and position accuracy, b is an apparatus condition coefficient expressed with residue including calibration and compensation, calibration condition parameter, calibration history, accumulated use time of limited-life parts, and generated error information, (a−b)Y is a quality grade and k is a coefficient.

5. A service method for calculating a charge M for use of an apparatus for manufacturing products including a semiconductor wafer, a semiconductor device, an exposure mask and a liquid crystal device based on the result of the calculation of $$M=\{X\times(a-b)Y\}\times Z\times k \text{ (where, } b \text{ includes 0)}$$

wherein X is a quantity of processed sheets of the products, a is a product grade coefficient expressed with the size accuracy, calibration tolerable value eliminating yield, alignment accuracy and position accuracy, b is an apparatus condition coefficient expressed with residue including calibration and compensation, calibration condition parameter, calibration history, accumulated use time of limited-life parts and generated error information, (a−b)Y is a quality grade, a yield coefficient, Z=1±α, where α is smaller than 1 and k is a coefficient.

6. A service method according to claim 5, wherein a database is provided to record the information about X, a, b, (a−b)Y, Z and k.

7. A manufacturing/inspection apparatus for manufacturing or inspecting products including a semiconductor wafer, a semiconductor device, an exposure mask or a liquid crystal device, said apparatus comprising a memory device for storing at least information pieces of process information indicating a quantity of manufactured or inspected products, accuracy information indicating a manufacturing or inspection accuracy of said products, running information indicating running conditions of said manufacturing/inspection apparatus and calibration information indicating a calibration value required for apparatus running control at a time of manufacture or inspection of said manufacturing/inspection apparatus, wherein a transmitting unit is provided to transmit the information stored in said memory device, a charge for use of said manufacturing/inspection apparatus is set based on the information transmitted by said transmitting unit, and a lower charge is set when the accuracy of said accuracy information is lower than the accuracy that may be implemented with said manufacturing/inspection apparatus.

8. A manufacturing/inspection apparatus for manufacturing or inspecting products including a semiconductor wafer, a semiconductor device, an exposure mask or a liquid crystal device, said apparatus comprising a memory device for storing at least information pieces of process information indicating a quantity of manufactured or inspected products, accuracy information indicating a manufacturing or inspection accuracy of said products, running information indicating running conditions of said manufacturing/inspection apparatus and calibration information indicating a calibration value required for apparatus running control at a time of manufacture or inspection of said manufacturing/inspection apparatus, wherein a charge for use of said manufacturing/inspection apparatus is set based on the information stored in said memory device and, wherein a lower charge is set when the accuracy of said accuracy information is lower than the accuracy that may be implemented with said manufacturing/inspection apparatus.

9. A service method according to claim 1, wherein a lower charge is set when the accuracy of said accuracy information is lower than the accuracy that can be implemented with said manufacturing/inspection apparatus.

10. A service system according to claim 1, wherein b is defined as not zero.

11. A service system according to claim 2, wherein b is defined as not zero.

12. A service system according to claim 1, wherein a database is provided to record the information about X, a, b (a−b)Y and k.

13. A system according to claim 2, wherein a database is provided to record the information about X, a, b, (a−b)Y and k.

14. A service method according to claim 4, wherein b is defined as not zero.

15. A service method according to claim 5, wherein b is defined as not zero.

16. A service method according to claim 4, wherein a database is used for storing the information about X, a, b, (a−b)Y, and k.

17. A service method according to claim 5, wherein a database is used for storing the information about X, a, b, (a−b)Y, and k.

\* \* \* \* \*